Feb. 19, 1935. B. C. PLACE 1,992,092
SECURING TRIM PANELS AND FASTENER THEREFOR
Filed Oct. 24, 1930   2 Sheets-Sheet 1
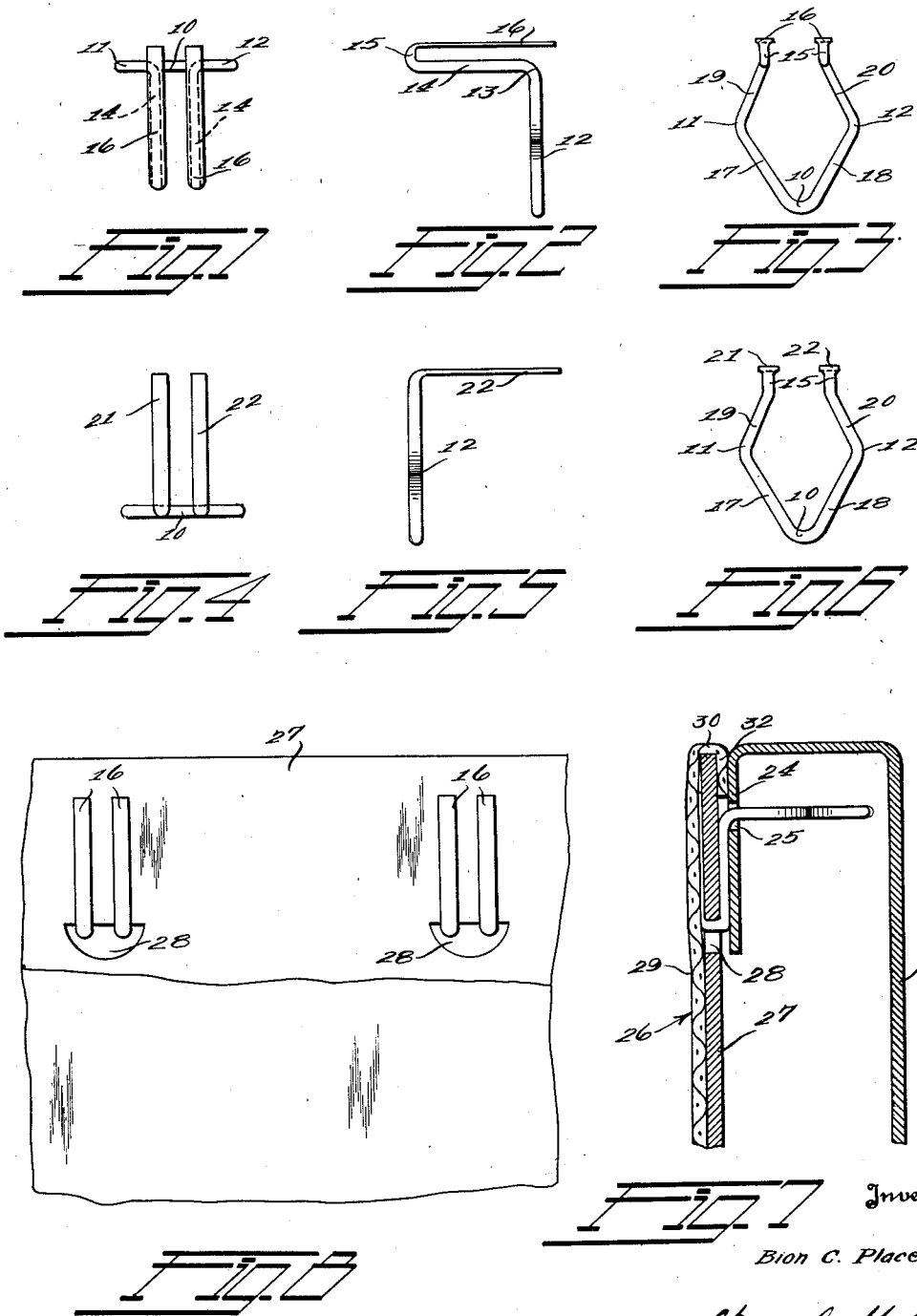
Inventor
Bion C. Place
By Strauch & Hoffman
Attorneys

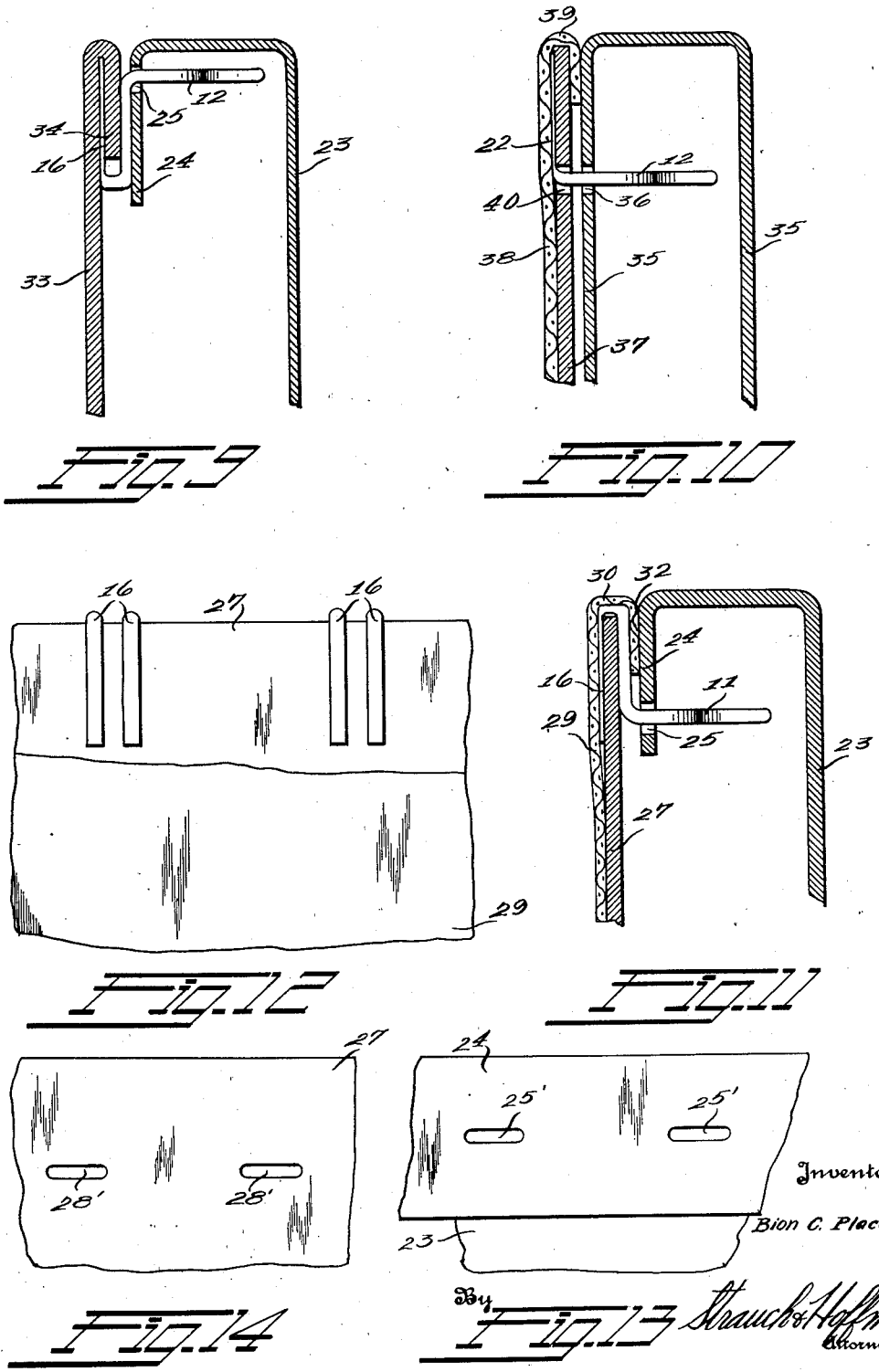

Patented Feb. 19, 1935

1,992,092

UNITED STATES PATENT OFFICE 1,992,092

SECURING TRIM PANELS AND FASTENER THEREFOR

Bion C. Place, Detroit, Mich., assignor of one-half to George E. Gagnier, Detroit, Mich.

Application October 24, 1930, Serial No. 491,034

4 Claims. (Cl. 24—215)

This invention relates to a fastener and to an arrangement for securing trim or similar panels to a suitable supporting structure. The invention is intended particularly for use in securing finish panels to the interior of automobile or similar bodies, though it is capable of wider use.

This invention aims to provide a fastener having a high degree of resilience and provided with a head of hook shaped form so shaped as to avoid the necessity for perforating the panel entirely, or, if the panel is perforated, of permitting the assembly of the fastener with respect to the panel through perforations of small size, whereby the panel is not materially weakened by the formation of openings therein for the assembly of the fastener with respect thereto.

A further object of the invention is to provide a fastener for securing trim or similar panels to the interior of automobile or similar bodies in which the head of the fastener, that is normally disposed between the fabric covering for the panel and the foundation thereof is of a minimum thickness, so that the fabric covering for the panel is not substantially spaced from the body thereof by the fasteners because of the fact that the heads thereof are disposed therebetween.

A further object of the invention is to provide a spring fastener having a hook-shaped head arranged to frictionally grip an edge, or a portion of the body, of a foundation of a panel, in which the hook-shaped head is formed from the ends of a single piece of wire or metal from which the fastener is constructed, the mid-portion of said piece of wire or metal being bent so as to provide an expansible and contractible shank of the fastener.

A further object of the invention is to provide an arrangement for securing trim panels to automobile or similar bodies, in such manner that the fasteners are non-rotatable in the openings or perforations in the supporting structure to which the panel is applied, or in the openings in the body of the panel through which the fastener passes.

Further objects of the invention will appear as a description thereof proceeds with reference to the accompanying drawings in which:—

Figures 1, 2, and 3, are, respectively, a top, side and end view of a preferred form of the improved fastener of this application.

Figures 4, 5, and 6, are, respectively, top, side and end views of a modified form of fastener.

Figure 7 is a sectional view through a panel and a supporting structure illustrating one way of using the fastener of Figures 1, 2 and 3.

Figure 8 is an elevational view of a fabric foundation or body of a panel secured in position by several of said fasteners, the fabric covering of the panel being removed to expose said fasteners.

Figure 9 is a sectional view similar to Figure 7, showing another way of using the same fastener.

Figure 10 is a sectional view through a panel and its supporting structure, showing one way of using the fastener illustrated in Figs. 4, 5 and 6.

Figure 11 is a sectional view through a panel and its supporting structure showing another way of using the fastener illustrated in Figs. 1, 2 and 3.

Figure 12 is a face view of a fragment of the panel shown in Fig. 11, the fabric covering opposite the fastener being broken away to expose the fasteners.

Figure 13 is a fragmentary inside view of a supporting structure, such as the door of an automobile body, showing the kind of perforations, that may be used to receive the improved fastener of this application.

Figure 14 is a fragmentary view of a foundation or body of a panel showing the type of opening that may be utilized in said body or foundation to receive the hook-shaped head of the fastener of this application.

Like reference characters indicate like parts throughout the several figures.

The improved fastener of this application is constructed from a single piece of metal, such as wire, for example. To form the fastener illustrated in Figs. 1, 2 and 3 of the drawings, which represents a preferred form, the piece of metal or wire is return-bent at approximately the mid-portion thereof at 10 providing legs 11 and 12 constituting the spring shank of the fastener. The ends of the wire are then turned approximately at right angles at 13 providing arms 14 constituting a part of the head of the fastener. Said ends of the piece of metal are then bent in a direction opposite from the shank of the fastener as indicated at 15 and said ends are then bent into approximate parallelism with the arms 14 to provide further arms 16. The arms 16 are preferably continued beyond the shank of the fastener but they may terminate short thereof, if desired.

The ends of the wire that form the arms 16 of the head are preferably flattened, so that the bearing surface of said arms on the panel is increased, and so that the projection or protuberance of said arms above the surface of the panel presently to be referred to may be minimized. If desired, the ends of the wire from which the fastener is formed may be flattened to a sufficient extent before forming the fastener that the arms 14 may likewise be formed of flattened wire, as well as the portions that connect arms 14 and 16. The legs 11 and 12 constituting the shank of the fastener are bowed outwardly as illustrated in Fig. 3 between the ends thereof, so as to provide convergently disposed guiding portions 17 and 18 and divergently disposed holding portions 19 and 20 on the shank of the fastener. A fastener is thus provided having a shank, including a pair of legs that are resiliently connected together adjacent the end of the shank for yielding movement with respect to said end and that the shank is formed so as to provide the outwardly bowed portions 11 and 12 that prevent the withdrawal of the fastener under ordinary circumstances. A fastener is also provided that includes a head in the form of a hook which head, in fact, includes the several hooks formed by the respective ends of the single piece of wire from which the fastener is constructed. The hooks formed from the ends of the wire are arranged in spaced relation as illustrated so that the shank of the fastener may be readily contracted to permit it to be entered into a perforation in the supporting structure as hereinafter described.

A modified form of fastener, obtaining some of the results of the fastener just described is illustrated in Figs. 4, 5 and 6. In this modification the shank thereof is formed substantially the same as in the fastener first described. That is, it includes a pair of legs that are resiliently connected together adjacent the end of the shank and that are so formed to prevent ready withdrawal of the fastener when said shank has been sprung into an opening in a supporting structure. The head of this fastener includes merely a single pair of arms 21 and 22 formed from the ends of the piece of wire or metal from which the fastener is formed. Said arms are bent at right angles to the shank of the fastener preferably in parallelism and in sufficiently spaced relation to permit the contraction of the shank of the fastener to the degree that may be necessary under the circumstances under which the fastener is used.

The fasteners just described are intended in particular for use in securing trim panels to metallic automobile bodies although they can obviously be used for many other purposes. A preferred way of using the fastener illustrated in Figs. 1–3, is shown in Figs. 7 and 8 of the drawings. In these figures the numeral 23 designates a suitable supporting structure such as an automobile door, for example. Said door may be provided with a flange 24 providing a support for the trim panel presently to be referred to. Said flange may be provided with a perforation 25 which may be round, oval, or of any desired form. The perforation may assume the form illustrated in Fig. 13 of the drawings and designated by the numeral 25'. Such a perforation conforms in outline to the outline of the shank of the fastener in transverse section, and when the fastener is entered therein as hereinafter described, rotation of the fastener is prohibited.

A trim panel 26 is applied to the supporting structure there shown. Said trim panel includes a suitable stiff body or foundation 27 constructed of fiber board or similar material, said body or foundation 27 being provided with openings 28 designed to permit the passing of the head of the fastener from the rear or normally uncovered portion of the trim panel. Openings 28 may assume any desired form, such as the half round form, illustrated in Fig. 8 of the drawings, or they may assume the form of an elongated slot as indicated at 28' in Fig. 14. In any event the major transverse dimension of the opening 28 or 28' should be approximately the same as the major transverse dimension of the shank of the fastener. The fastener above described does accordingly not necessitate the formation of large openings in the foundation or body of the trim panel for assembly of the fastener with respect thereto.

In the preferred form of the invention, the body or foundation 27 of the panel has the outer surface thereof covered by a suitable fabric 29 which may be separated from the body 27 by wadding, if desired. The fabric 29 laps the upper edge of the foundation or body 27 as indicated at 30, and is continued to the rear of the body or foundation 27 as indicated at 32. The fabric is preferably glued to the foundation or body at the edges thereof, although the portion of the fabric opposite the openings 28 is maintained free of attachment to the body or foundation so as to permit the entry of a portion of the head of the fastener therebetween, as hereinafter described.

The trim panels are constructed by forming the openings 28 of any desired form in the foundation or body. The covering material or fabric is then secured over one face, which is intended to be the exposed face of the trim panel, and the edges lapped around the edges of the foundation or body as above described. The fasteners are then assembled with respect to the trim panel by tilting the fastener slightly so as to permit the entry of the ends of the arms 16 through the openings 28. The fastener is then moved until said arms are disposed wholly between the foundation or body and the fabric covering for the panel as illustrated in Figure 7. Inasmuch as the arms 16 are flattened as above described it will be readily understood that the insertion of such arms in the manner just described, between the fabric and the foundation will not cause visible protrusion on the outer or exposed surface of the panel. Preferably the arms 16 and 14 are spaced outwardly so that the body of the foundation of the panel is gripped firmly between said arms when the fastener is in position so that the fastener cannot become readily detached from the panel in applying it to operative position.

After each of the openings in the foundation or body has been provided with fasteners in the manner just described, the panel is assembled with respect to the supporting structure by bringing the protruding shanks of the fastener opposite the perforations 25 in the supporting structure. Pressure is applied against the fasteners in a direction so as to cause the shanks of the fastener to enter the perforations 25 in the supporting structure. The convergently disposed guiding portions 17 and 18 engage the sides of the perforations in said supporting structure, and since said perforations are made smaller than the major transverse dimension of said shanks, it will be readily understood that the shank of the fastener is first contracted as the fastener enters the opening or perforation. As the movement of the fastener through the perforation 25' is continued the legs thereof spring apart, when the divergently disposed portions are arranged opposite the walls of said opening or perforation. In this position the fasteners firmly engage the corners of said openings and prevent ready withdrawal of the fastener from the perforation, while at the same time exerting a yielding pressure drawing the panel toward the supporting structure.

If desired, the fasteners illustrated in Figs. 1, 2 and 3 may be utilized as illustrated in Figs. 11 and 12. As shown in these figures, the body 27 is unperforated, and the fasteners are applied to the body by causing an edge of the panel or body to enter the hook-shaped head of the fastener, or between the arms 14 and 16 thereof. Said arms are spaced apart sufficiently so that the body or foundation of the panel will be firmly gripped between them. It will be readily understood that the fasteners can be slid along the edge of the body of the panel and brought in any desired position opposite the opening in the supporting structure provided to receive it. If desired, the fabric 29 may be maintained free of the body at points along the edge thereof to permit the insertion of the fasteners in the manner just described, or of course, if desired, the fabric outer covering may be omitted if an uncovered panel is to be used. In operative position the edge 32 of the fabric is folded around the edge of the body or foundation, and is clamped between the supporting structure and the edge portion of said body or foundation of the panel.

The fastener illustrated in Figs. 1, 2 and 3 may also be used in the manner indicated in Fig. 9 of the drawings, in which a panel 33 is illustrated, provided with an edge 34 return bent toward the rear of the panel. The panel 33 may include a fibrous or similar body and a covering cemented thereto, or may be constructed in any manner. As illustrated in Fig. 9 the return bent edge 34 of the panel is received between the arms 14 and 16 of the fastener, and the fastener is applied to the supporting structure in the manner above pointed out.

One way of using the fastener illustrated in Figs. 4, 5, and 6 is illustrated in Fig. 10 of the drawings. In this figure a suitable supporting structure 35 is provided having a perforation 36, preferably in the form of an elongated slot. A trim panel having a fibrous or similar foundation 37, covered on one of its faces by a fabric or similar finishing material 38, lapped around an edge as shown at 39, is perforated at 40. A narrow slot such as 28' (Fig. 14) may be employed. The arms 21 and 22 of the fastener are inserted in said slot to bring said arms between the body and the finishing material. The panel is then applied to the supporting structure as above described. The elongated slots in said structure and in the body of the panel prevent turning of the fastener when in operative position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:—

1. A one-piece metallic spring fastener having a shank formed from the mid portion of a piece of metal so as to provide resilient legs bowed outwardly to form convergently disposed guiding portions and divergently disposed holding portions connected together at the end of the shank so as to yield with respect to that end, and a head including arms formed from the ends of said piece of metal and disposed in substantial parallelism in planes substantially normal to said shank.

2. A one-piece metallic spring fastener having a shank formed from the mid portion of a piece of metal so as to provide resilient legs bowed outwardly to form convergently disposed guiding portions and divergently disposed holding portions connected together at the end of the shank so as to yield with respect to that end, and a head formed by bending each end of said piece of metal into the form of a hook, the hooks of the several ends of the metal being disposed side by side in spaced relation.

3. A one-piece metallic spring fastener having a shank formed from the mid portion of a piece of wire so as to provide resilient legs bowed outwardly to form convergently disposed guiding portions and divergently disposed holding portions connected together at the end of the shank so as to yield with respect to that end, and a head including arms formed from the flattened ends of said piece of wire and disposed in substantial parallelism in planes substantially normal to said shank.

4. A one-piece metallic spring fastener having a shank formed from the mid portion of a piece of wire so as to provide resilient legs bowed outwardly to form convergently disposed guiding portions and divergently disposed holding portions connected together at the end of the shank so as to yield with respect to that end, and a head formed by bending each end of said piece of wire in the form of a hook, the arms of each of said hooks remote from said shank being flattened so as to minimize protrusion of the head of the fastener beyond the outer face of the material secured by the fastener.

BION C. PLACE.